United States Patent [19]

Godbey, Jr. et al.

[11] Patent Number: 4,966,948

[45] Date of Patent: Oct. 30, 1990

[54] CARBODIIMIDE AND METAL CONTAINING EMULSION OR DISPERSION COATING COMPOSITION

[75] Inventors: E. Floyd Godbey, Jr., Louisville, Ky.; Norman G. Wolfe, New Albany, Ind.; David J. Zepka, Louisville, Ky.

[73] Assignee: Akzo Coatings, Inc., Louisville, Ky.

[21] Appl. No.: 258,149

[22] Filed: Oct. 14, 1988

[51] Int. Cl.$^5$ .............................. C08F 8/30; C08F 8/42
[52] U.S. Cl. .............................. 525/329.9; 525/330.2; 525/330.5; 525/330.6; 525/370; 525/371; 525/374; 525/453
[58] Field of Search .................... 525/370, 371, 329.9, 525/374, 453, 330.6, 330.5, 330.2

[56] References Cited

U.S. PATENT DOCUMENTS 3,886,125  5/1975  Chromecek .............. 525/330.6
4,612,054  9/1986  Hamon .................... 528/295.5

*Primary Examiner*—Joseph L. Schofer
*Assistant Examiner*—Thomas McDonald, Jr.
*Attorney, Agent, or Firm*—Donald L. Cox; David J. Roper

[57] ABSTRACT

A coating composition containing a carboxyl functional polymeric emulsion or dispersion, a carbodiimide and a transition metal catalyst which upon curing provides coatings with improved resistance properties.

18 Claims, No Drawings

CARBODIIMIDE AND METAL CONTAINING EMULSION OR DISPERSION COATING COMPOSITION

BACKGROUND OF THE INVENTION

1. Field of Invention

This invention relates to coating compositions. More particularly, this invention relates to emulsion or dispersion coatings of carboxyl functional polymers.

2. Prior Art

The use of carbodiimides alone to crosslink emulsion-based coatings is known as is the use of metal driers alone to crosslink emulsion coatings. However, in neither case is a satisfactory degree of crosslinking achieved because the films crosslinked in this fashion exhibit reduced properties when compared to films and coatings crosslinked employing different reaction mechanisms.

The applicants, on the other hand, have overcome these problems by utilizing a carboxylic acid containing coating composition in admixture with a carbodiimide and a certain metal catalyst. By employing this critical mixture of components, the degree of crosslinking and the resulting physical and chemical resistance properties of cured coatings are significantly increased over the properties of coatings cured with a carbodiimide or a metal alone. In addition, in some applications, the cure time for the coating is significantly reduced as compared to the cure time when a carbodiimide or a metal alone is used.

While films having good chemical and physical resistance properties have been obtained utilizing melamine/formaldehyde or urea/formaldehyde curing agents, these formaldehyde-based materials are highly undesirable given current concerns about formaldehyde. In addition, although films have been obtained utilizing low or medium solids, two package polyurethane systems, these acrylic or polyester based polyurethanes are also highly undesirable because of the organic solvents which are emmitted during spray application of the coating and the toxicity of certain polyisocyanate reactants. By employing the combination of a carbodiimide and a metal as the crosslinking system, the undesirable properties of polyisocyanates and formaldehyde-containing curing agents are eliminated.

In U.S. Pat. No. 4,321,394, the reaction of carbodiimides and hydroxyl group containing compounds in the presence of a tin catalyst is disclosed. The patent, however, does not disclose the use of a carboxylic acid containing polymer emulsion or the use of a metal as a crosslinking catalyst.

U.S. Pat. No. 4,487,964 discloses a method for preparing mixed aliphatic/aromatic polycarbodiimides which may be employed as crosslinking agents for carboxylated latices. However, this patent does not disclose the use of a metal crosslinking catalyst of the type disclosed in the instant invention.

U.S. Pat. No. 4,612,054 discloses a coating composition containing a carbodiimide. The carbodiimide may be used in conjunction with conventional drying agents, such as metal salts, to crosslink alkyd or polyacrylate resins. However, there is no disclosure that a metal can be used to catalyze the crosslinking activity of the carbodiimide or that metal salts like transition metal ammonium carbonates or transition metal chlorides may be employed to achieve improved cured state film properties.

Accordingly, it is an object of this invention to prepare water-based coating compositions.

It is the further object of this invention to prepare carbodiimide and metal salt containing emulsion or disperson water-based coating compositions.

It is also an object of this invention to prepare carboxylic acid-containing, emulsion, dispersion, or soluble based coating compositions having a greater degree of crosslinking and thereby improved physical and chemical resistance when cured.

It is a further object of this invention to prepare a low temperature curing emulsion or dispersion coating.

It is yet another object of this invention to prepare highly crosslinked chemically and physically resistant coating compositions which do not contain formaldehyde-based curing agents.

It is another object of this invention to prepare acrylic emulsion or polyurethane dispersion based coatings which do not need to be reacted with polyisocyanates.

These and other objectives are obtained by preparing the coating compositions of the instant invention.

SUMMARY OF THE INVENTION

The coating compositions of the instant invention comprise about 56 to about 98.75 solids percent by weight of an aqueous emulsion or dispersion polymer having an acid number of about 25 to 250, about 1 to about 40 percent by weight solids of a carbodiimide crosslinking agent and about 0.25 to about 4 percent by weight solids of a transition metal catalyst based upon the total solids weight of the aqueous emulsion or dispersion polymer, the carbodiimide and the metal catalyst present in the composition. The composition of the instant invention can be used to prepare coatings having improved physical and chemical resistance properties.

DETAILED DESCRIPTION OF THE INVENTION

The carbodiimide crosslinking agents that may be employed in this invention may have the following general formula:

$$A-N=C=N-B$$

wherein A and B may be the same or different and are selected from unsubstituted alkyl or aryl groups or substituted alkyl or aryl groups containing substituents which do not interfere with the reactions described in this invention, for example, by steric hindrance or by causing competing side reactions. Preferably, A and B are the same and are alkyl.

In addition, polycarbodiimides may be employed as the crosslinking agents of this invention. Preferably, the polycarbodiimides are aliphatic polycarbodiimides or mixed aliphatic/aromatic polycarbodiimides.

The processes for the preparation of carbodiimides and polycarbodiimides are well known in the art. For example, carbodiimides may be prepared by reacting thioureas with mercuric oxide, by reacting organic isocyanates with phosphine-imines or by converting isocyantes to carbodiimides in the presence of certain phospholines or phospholine oxides. Examples of suitable carbodiimides and polycarbodiimides and their preparation are disclosed in U.S. Pat. Nos. 3,426,025, 2,938,892, 3,135,748, and 4,118,536 and in the article "The Chemistry of Carbodiimides," by H. G. Khorana, *Chemical Reviews,* Volume 53 (1953). These references are incorporated herein by reference.

Suitable mixed aliphatic/aromatic polycarbodiimides for use in this invention are disclosed in U.S. Pat. No. 4,487,964, which is incorporated herein by reference.

The metal catalysts employed in the instant invention are multivalent, transition metals having a valence of at least +2 which are soluble in the carboxylic acid-containing aqueous emulsions and dispersions of the present invention. Preferred metals include Fe, Zn, Zr, and Ti. Preferably, the metal catalyst is Zn or Zr. The metal is preferably introduced into the coating composition in the form of a transition metal salt or a titanate which is soluble in the coating. Preferably, the transition metal salt is in the form of an ammonium carbonate or a halide which most preferably is a chloride. For example, the transition metal catalyst preferably can be selected from the group consisting of zinc chloride, zirconium chloride, zinc ammonium carbonate, and zirconium ammonium carbonate, and most preferably from the group consisting of zinc ammonium carbonate and zirconium ammonium carbonate. In addition, transition metal acetate may be employed, such as barium, calcium and magnesium acetate. When Ti is the metal catalyst, it is preferred that a titanate be employed. Suitable titanates may be selected from the group consisting of alkyl and aryl titanates, titanium alkoxyhalides, titanium chelates, such as glycol and dicarboxylic acid titanates, and aminoalkyl titanates. Preferred titanates include isopropyl tri(N-ethylamine-ethylamino) titanate, tetra-isopropyl di(dioctylphosphito) titanate and di(dioctyl pyrophosphato) ethylene titanate.

The metal catalyst salt or titanate can be added as is or if necessary, dissolved in a suitable solvent. Examples of suitable solvents include water and water miscible alcohols.

The carboxyl containing emulsions and dispersions of the present invention should have a pH of at least about 8.0 in order to prevent the transition metal catalyst salt from precipitating out of solution.

The polymers suitable for use in this invention are carboxyl functional emulsion or dispersion polymers, such as acrylic, polyester, polyurethane, epoxy, vinyl, epoxy ester, and styrene malaeic anhydride emulsions or dispersions. Preferably, the polymer is a carboxyl-containing acrylic emulsion polymer or a carboxyl-containing polyurethane dispersion polymer in which the carboxyl groups are attached to the polymer backbone and are not sufficiently sterically hindered so as to prevent reaction with the metal catalyst and/or the carbodiimide. Generally, the carboxyl functional emulsion polymer has a solids acid value in the range of about 25 to about 250, preferably about 35 to about 80, and most preferably about 40 to about 60.

An emulsion or dispersion containing the polymer may be prepared by means well known in the art, or commercially available emulsions or dispersions may be employed. Suitable commercially available emulsions and dispersions include Nacrylics, which are acrylic emulsions available from National Starch, Joncryl ® resins which are acrylic emulsions available from the Johnson Wax Co., UCAR ® emulsions, which are acrylic emulsions available from Union Carbide Corporation, and Neorez ® resins, which are polyurethane dispersions available from ICI Resins U.S.

Optionally, a flaked acrylic resin .having an acid value in the range of about 150 to about 250 may be used as the carboxyl functional polymer of the coating composition. In addition, the flaked acrylic resin may be added to the carboxyl functional polymer containing emulsion or dispersion to improve the gloss of the cured coating. As used herein, the term "flaked acrylic resin" means a carboxyl containing acrylic resin that is a 100 percent solids, alkali soluble acrylic polymer. Up to about 30 percent by weight solids of the flaked acrylic resin may be added to improve the gloss. Prior to being added to the coating composition, the flaked acrylic resin is preferably dissolved in water. It may, however, be necessary to add a glycol, an alcohol or ammonia in order to dissolve the flaked acrylic resin in water. Commercially suitable flaked acrylic resins are available from Johnson Wax Co. and other sources. The flaked acrylic resins generally have low molecular weights, Mw, in the range of about 1000 to about 15,000.

The coating compositions of the present invention may be compounded with conventional binders, reinforcing agents, defoamers, fillers, plasticizers, flow control agents, pigments and the like. In addition, amines, wetting agents, and defoamers may be added.

The coating compositions of the present invention are generally prepared by adding the various fillers, binders, surfactants, flow control agents, water, solvents and pigments and then dispersing until a smooth and uniform mixture is achieved. This premix is then added to the resin to which the metal catalyst and other additives have been added.

The carbodiimide is not added until shortly before the composition is to be applied as a coating. In most cases, the carbodiimide will be dissolved in a suitable, water miscible solvent prior to being added to the composition. Examples of suitable solvents include acetates, such as propylene glycol monomethyl ether acetate, and ketones, such as methyl propyl ketone. Generally, the coating composition should be used within 24 hours and preferably within 12 hours after the carbodiimide is added.

The coating composition preferably will contain about 56 to about 98.75 percent by weight solids, most preferably from about 87.25 to about 98.5 percent by weight of the carboxyl functional polymer, about 1 to about 40 percent by weight solids, most preferably about 1 to about 10 percent by weight solids of the carbodiimide, and about 0.25 to about 4 percent by weight solids, and most preferably about 0.5 to about 2.75 percent by weight of the transition metal catalyst salt or titanate based upon the total solids weight of the carboxyl functional polymer, the carbodiimide and the metal catalyst salt or titanate.

The compositions of this invention may be applied by conventional coating application methods including brushing, rolling, dipping and spraying of the air assisted, airless, or electrostatic types. The compositions may be applied to a wide variety of substrates, such as wooden, plastic, paper and metallic substrates.

After being applied to a substrate, the coating is cured by air drying, or by baking at various temperatures for varying time intervals depending on the substrate being coated. For example, cure schedules of about 30 minutes at 150° F. for plastic, 120°-300° F. for a few seconds to up to one minute or more for paper, or 350° F. for 20 minutes on metallic substrates are typical.

The cured coatings of the present invention have greatly improved hardness, abrasion resistance, scrub resistance and solvent resistance properties when compared to prior art, water-based coatings which do not employ both a carbodiimide and a metal catalyst as crosslinking agents. Thus, by using the compositions of the present invention, it is possible to prepare coatings having better hardness, abrasion resistance, solvent resistance, scrub resistance and gloss than prior art, water-based, cured emulsion or dispersion coatings.

The invention is illustrated by the following examples in which all percentages are by weight unless otherwise specified.

EXAMPLE 1

To a 1000 ml round bottom flask equipped with a magnetic stirrer was added 51.53 g of Joncryl ® 538 and 23.96 g of Joncryl ® 537, which are carboxyl containing acrylic emulsion polymers available from Johnson Wax Co. Joncryl ® 537 has a Brookfield viscosity of 100 to 200 cps, an acid value of 40, a pH of 8.3 to 8.8, a molecular weight, Mw, greater than 200,000, a density of 1.05 g/cc at 25°, and a Tg of 42° C. Joncryl ® 538 has a Brookfield viscosity of 250 cps, an acid value of 53, a pH of 8.5, a molecular weight, Mw, greater than 200,000, a density of 1.06 g/cc at 25° C., and a Tg of 81° C. Next, 0.34 g of a silicone defoamer, 9.50 g of 2-butoxy ethanol (ethylene glycol monobutyl ether) and 0.32 g of Solvesso 100 were added in that order over five minutes. Next, 0.97 g of a silicone wetting agent, 5.83 g of water and 5.52 g of a polyethylene wax were added followed by 1.96 g of a 15 percent by weight solids solution of zinc ammonium carbonate dissolved in water and ammonia.

After the above blend was prepared, it was divided into three aliquots. A paper panel having a plaid pattern was then coated with one of the aliquots by using a dry roller coater. The panel was heated for about 30 seconds in a 200° F. conveyor oven. When tested, the panel had a TSP scrub resistance of about approximately 300 and a 60° gloss of 22.5.

EXAMPLE 2

To the second aliquot prepared in Example 1 was added 3 percent by volume of a 50 percent by weight solution of CBM 153-30-3, which is a multifunctional carbodiimide crosslinker obtained from Union Carbide Corp., dissolved in propylene glycol monomethyl ether acetate. The carbodiimide had an equivalent weight of 175, a boiling point of 150° C., a specific gravity of 0.969, a flashpoint of 114° F. and a vapor pressure at 20° C. of 3.7 mm Hg. The resulting coating composition was applied to a paper panel using the process described in Example 1. When tested, the coating had a TSP scrub resistance of approximately 750 and a 60° gloss of 21.5.

EXAMPLE 3

To the third aliquot prepared in Example 1 was added 3 percent by volume of a 50 percent by weight solution of CBM 153-30-1, which is a multifunctional carbodiimide crosslinker obtained from Union Carbide Corp., dissolved in propylene glycol monomethyl ether acetate. The carbodiimide had an equivalent weight of 165, a boiling point of 146° C., a specific gravity of 0.97, a vapor pressure at 20° C. of 3.7 mm Hg and a flashpoint of 114° F. The composition was coated on a paper panel using the process described in Example 1. When tested, the coating had a TSP scrub resistance of approximately 700 and a 60° gloss of 22.

EXAMPLE 4

Example 1 was repeated except that no zinc ammonium carbonate was added to the composition. The composition was divided into three aliquots and one aliquot was applied to a paper panel using the process described in Example 1. When tested, the coating had a scrub resistance of approximately 200 and a 60° gloss of 20.

EXAMPLE 5

Example 2 was repeated except that the aliquot used was from the coating prepared in Example 4. When tested, the panel had a TSP scrub resistance of approximately 500 and a 60° gloss of 20.

EXAMPLE 6

Example 3 was repeated except that the aliquot used was from the coating prepared in Example 4. When tested, the coating had a TSP scrub resistance of approximately 375 and a 60° gloss of 19.

EXAMPLE 7

Example 6 was repeated except that the composition contained about 4 percent by volume of the zinc ammonium carbonate solution and 3 percent by volume of the carbodiimide. When tested, the coating had a scrub resistance of approximately 525 and a 60° gloss of 20.5.

EXAMPLE 8

Example 7 was repeated except that 10 percent by volume, based upon the total volume of the composition, of a solution containing an flaked acrylic resin (Joncryl ® 682) available from Johnson Wax Co. having an acid value of 230, a softening point of 110° C. and a molecular weight of about 2,500 was added. The solution containing the acrylic flaked resin was prepared by dissolving 1197 grams of Joncryl ® 682 in 830 ml of water, 1050 g of methanol, 200 g of butoxy ethanol and 250 ml of 28°NH4OH (i.e. concentrated ammonium hydroxide) at room temperature. When evaluated, the coating had a TSP scrub resistance of approximately 525 and a 60° gloss of 27.5.

EXAMPLE 9

Example 1 was repeated except that 25.99 g of Joncryl ® 537 was used instead 23.96 g, 1.05 g of a 15 percent by weight solids solution of zinc ammonium carbonate was employed instead of 1.96 g, and 3.514 g of a 50 percent solution of CBM 153-30-3 dissolved in propylene gycol monomethyl ether was added. The composition was spray coated onto a variety of plastic substrates, such as Noryl ® FN 215, available from General Electric Co., Lexan ® 900, available from General Electric Co., and Styron ®6087 SF, available from Dow Chemical Co. The coatings Were cured by heating in a 135° F. oven for about 30 minutes. The composition was also spray coated onto Bonderite ® 1000 metal panels, and then cured in a 200° F. oven for about 30 minutes.

EXAMPLE 10

Example 9 was repeated except that the carbodiimide and zinc ammonium carbonate were not added. When the coatings on the metal panels of Examples 9 and 10 were spot tested, the coatings prepared from the composition containing the carbodiimide and the zinc ammonium carbonate showed better solvent resistance.

For example, when tested with isopropyl alcohol, the carbodiimide containing coatings showed no spotting whereas the non-carbodiimide containing coatings showed spotting. The coatings were spot tested by applying a solvent to the coated surface and keeping the solvent in contact with the coated surface for about three to about five minutes. For volatile solvents, the area tested was covered with a suitable sized watch glass. After the exposure time elapsed, the solvent was removed with a soft paper towel or a cheesecloth, and the coated area that was in contact with the solvent was immediately evaluated.

EXAMPLE 11

Example 1 was repeated except that 75.49 g of R960 Neorez, which is a polyurethane dispersion available from ICI Resin U.S. and which has an acid value of about 30, a pH of 8.4 to 8.8, a molecular weight Mw, greater than 100,000, a density of 1.04 g/cc at 25° C. and a Tg of 27, was employed instead of the Joncryl ®537 and 538 resins. The composition was spray coated onto a metal Bonderite ® 000 panel and cured for about 30 minutes in a 200° F. oven. The resulting coating displayed good adhesion to the substrate as well as superior hardness and solvent resistance properties when compared to a coating prepared from a composition containing the same polyurethane dispersion but not containing a carbodiimide and a metal catalyst.

EXAMPLE 12

Example 2 was repeated except that zirconium ammonium carbonate was employed instead of zinc ammonium carbonate. When the composition was applied to a paper substrate, cured and then tested, it exhibited a higher TSP scrub resistance than a similar coating not containing the metal catalyst and/or a carbodiimide. Likewise, when applied to a metal substrate and cured for 30 minutes in a 200° F. oven, the cured coating displayed better solvent resistance than a coating not containing the metal catalyst and/or a carbodiimide.

EXAMPLE 13

To a 1000 ml round bottom flask were added 110.02 g of diethylene glycol n-butyl ether, 1.96 g of a defoamer, 13.90 g of wetting agents, and 6.51 g of amino propanol. Then 250 g of TiO2 along with 296.50 g of other pigments were added and were stirred until there was a dispersion having a Hegman reading of 6. Then 17.35 g of diethylene glycol n-butyl ether were added.

In a 2000 ml round bottom flask equipped with a magnetic stirrer were added 219.50 g of Joncryl ® 537 and 416.71 g of Joncryl ® 538 resins (see Example 1 above for a description of the resins) and 1.60 g of a defoamer. To the Joncryl resins was added a solution containing 10 percent by weight ammonium benzoate in water, 6.51 g of dimethyl amino ethanol and 38.47 g of a 15 percent by weight solution of zinc ammonium carbonate in water and ammonia. After stirring, the dispersion containing the pigments was added to the resins. Finally, 57.97 g of UCARLNK-XL 27 SE, which is a multifunctional carbodiimide crosslinker obtained from Union Carbide Corporation, was added.

The coating composition was applied to plastic substrates and baked in a 135° F. oven for about 30 minutes. The resulting cured coatings had improved resistance properties and physical characteristics when compared to coatings not containing the carbodiimide and metal catalyst.

A tabulation of the results of Examples 1-6 is shown in Table I below. Examples 1 and 4 demonstrate that the transition metal catalyst improves the scrub resistance without adversely affecting the gloss. Examples 5 and 6 demonstrate that employing carbodiimides without a transition metal catalyst will improve the scrub resistance, and Examples 2 and 3 demonstrate that by employing both a carbodiimide and a transition metal catalyst, the scrub resistance is signficantly increased over the use of either a carbodiimide or a transition metal catalyst alone. Examples 7 and 8 demonstrate that an acrylic flaked resin may be employed with the compositions of the present invention to enhance the gloss without adversely affecting the improved scrub resistance. Examples 9 and 10 demonstrate that the coating compositions may be applied to plastic and metal substrates and that the solvent resistance of the cured coatings is increased when a carbodiimide and a metal catalyst are employed.

TABLE I

| | EXAMPLE | | | | | |
|---|---|---|---|---|---|---|
| | 1 | 2 | 3 | 4 | 5 | 6 |
| $Zn^{++}$ | 2% | 2% | 2% | 0% | 0% | 0% |
| Carbodiimide | | | | | | |
| CBM 153-30-1 | 0% | 0% | 3% | 0% | 0% | 3% |
| CBM 153-30-3 | 0% | 3% | 0% | 0% | 3% | 0% |
| TSP Scrub | | | | | | |
| Resistance | 300 | 750 | 700 | 200 | 500 | 375 |
| 60° Gloss | 22.5 | 21.5 | 22 | 20. | 20 | 19 |

What is claimed is:

1. A coating composition having improved cure properties comprising a blend of:
   (a) about 56 to about 98.75 percent by weight solids of a carboxyl functional polymer having an acid value in the range of about 25 to about 250;
   (b) about 1 to about 40 percent by weight solids of a carbodiimide; and
   (c) about 0.25 to about by weight solids of a transition metal salt or a titanate, where the transition metal salt is selected from the group consisting of zinc chloride, zinc ammonium carbonate, and zirconium ammonium carbonate.

2. A coating composition having improved cure properties comprising:
   (a) about 56 to about 98.75 percent by weight solids a carboxyl functional polymer having an acid value in the range of about 25 to about 250;
   (b) a carbodiimide present in the range of about 1 to about 40 percent by weight solids; and
   (c) zinc ammonium carbonate, zirconium ammonium carbonate, zinc chloride, or a titanate present in the range of about 0.25 to about 4 percent by weight solids.

3. A coating composition having improved cure properties comprising:
   (a) about 56 to about 98.75 percent by weight solids of a carboxyl-containing acrylic emulsion polymer having an acid value in the range of about 25 to about 250;
   (b) about 1 to about 40 percent by weight solids of a carbodiimide; and
   (c) 0.25 to about 4 percent by weight solids of zinc ammonium carbonate or zirconium ammonium carbonate.

4. The coating composition of claim 2 wherein the carboxyl polymer is present in the range of about 87.25 to about 98.5 percent by weight solids, the carbodiimide is present in the range of about 1 to about 10 percent by weight solids, and the zinc ammonium carbonate, zirconium ammonium carbonate, zinc chloride, or a titanate is present in the range of about 0.5 to about 2.75 percent by weight solids.

5. A coating composition having improved cure properties comprising a blend of:
 (a) about 56 to about 98.75 percent by weight solids of a carboxyl-containing acrylic emulsion polymer having an acid value in the range of about 25 to about 250;
 (b) about 1 to about 40 percent by weight solids of a carbodiimide; and
 (c) about 0.25 to about 4 percent by weight solids of zinc ammonium carbonate, zinc chloride or zirconium ammonium carbonate.

6. A coating composition having improved cure properties comprising a blend of:
 (a) about 56 to about 98.75 percent by weight solids of a carboxyl-containing polyurethane dispersion polymer having an acid value in the range of about 25 to about 250;
 (b) about 1 to about 40 percent by weight solids of a carbodiimide; and
 (c) about 0.25 to about 4 percent by weight solids of zinc ammonium carbonate, zinc chloride, or zirconium ammonium carbonate.

7. The composition of claim 1 wherein the transition metal salt is selected from the group consisting of zinc ammonium carbonate or zirconium ammonium carbonate.

8. The composition of claim 1 wherein the titanate is selected from the group consisting of isopropyl tri(N-ethylamine-ethylamino) titanate, tetra-isopropyl di(dioctylphosphito) titanate and di(dioctyl phrophosphato) ethylene titanate.

9. The composition of claims 2, 3, 4, 5, or 6 wherein the carbodiimide has the following formula:

$$A-N=C=N-B$$

wherein A and B may be the same or different and are selected from unsubstituted alkyl or aryl groups or substituted alkyl or aryl groups containing substituents which do not interfere with the reactants.

10. The coating compositions of claims 2, 3, 4, 5 or 6 wherein the carbodiimide is a polycarbodiimide.

11. The composition of claims 2, 3, 4, 5 or 6 wherein the carbodiimide is an aliphatic carbodiimide.

12. The composition of claims 2, 3, 4, 5 or 6 wherein the carbodiimide is a mixed aliphatic/aromatic polycarbodiimide.

13. The composition of claims 2, 3, 4, 5 or 6 in admixture with up to about 30 percent by weight of a flaked acrylic resin.

14. The composition of claims 2, 3, 4, 5 or 6 wherein the emulsion or dispersion polymer has an acid value in the range of about 35 to about 80.

15. The composition of claims 2, 3, 4, 5 or 6 wherein the emulsion or dispersion polymer has an acid value in the range of about 40 to about 60.

16. The composition of claim 2 or 4 wherein the carboxyl functional polymer is a carboxyl-containing polyurethane dispersion or a carboxyl-containing acrylic emulsion.

17. The composition of claims 2 or 4 wherein zinc ammonium carbonate or zirconium ammonium carbonate is present.

18. The composition of claim 2 wherein component (c) comprises zinc ammonium carbonate, zinc chloride, or zirconium ammonium carbonate.

* * * * *

UNITED STATES PATENT AND TRADEMARK OFFICE
CERTIFICATE OF CORRECTION

PATENT NO. : 4,966,948

DATED : October 30, 1990

INVENTOR(S) : E. Floyd Godbey, Jr., Norman G. Wolfe and David J. Zepka

It is certified that error appears in the above-identified patent and that said Letters Patent is hereby corrected as shown below:

Column 7, line 22, delete "000" and insert --1000--.

Column 8, line 39, before the word "by" insert --4 percent--.

Signed and Sealed this

Fourteenth Day of July, 1992

Attest:

DOUGLAS B. COMER

*Attesting Officer*  *Acting Commissioner of Patents and Trademarks*